Patented Dec. 30, 1930

1,786,488

UNITED STATES PATENT OFFICE

FELIX HOMBERG, OF BARMEN, GERMANY, ASSIGNOR TO AMERICAN NUPLAX CORPORATION, OF NEW YORK, N. Y., A CORPORATION OF DELAWARE

PROCESS FOR THE MANUFACTURE FROM BLOOD OF A MASS CAPABLE OF BEING COLORED

No Drawing. Application filed December 9, 1925, Serial No. 74,399, and in Germany December 11, 1924.

In order to produce colored masses from blood, efforts have hitherto been made to bleach the initial substance, that is, the blood, by treatment with oxygen producing means, but it has never been possible to produce valuable plastic masses in this manner. Only masses produced from natural and therefore unbleached blood were capable of use. In any case their introduction and general use was hindered by the deep black metallic shiny color of their surfaces.

In a surprising manner, I am now able to produce, and quite simply, a basic mass from blood, which not only is sufficiently clear or devoid of color to form a foundation for many colorations, but which also has the property, when placed into hot dye solutions, of being permanently coated or dyed in a short time with the color of the solution.

In this manner it is possible for the finished article, produced either in rod or plate form by turning or by direct pressing, to be colored with the desired color after its completion, either before or after hardening.

For carrying out the process dry or slightly moistened blood is mixed with a sufficient quantity of white inorganic substances such as lithopone, zinc white, heavy spar, antimony oxide and the like. In practice it has been found that a good mixture is produced by using in parts by weight, from 25% to 60% of the inorganic substance employed, and from 75% to 40% of the blood.

The addition of filler can vary from 1% up to 85% or 90%. If, for instance, 1% of lithopone be used, a black mass is obtained, which can be bleached by $H_2O_2$, to a dark brown. The greater the proportion of filler used, the lighter is the resulting color. With 60% filler a light gray results, which can be bleached to a substantially white color. It will be understood that the extremely low and extremely high percentages of filler do not give as good results from a commercial standpoint as the moderate percentages.

For making buttons, a mixture of 40% lithopone and 60% blood is found desirable.

The constituents are finely ground and intimately mixed. The finely ground intimate mixture is then formed, by pressure and heat, into an entirely homogeneous mass which is very tough and resistant. Pressures varying from approximately 70 to 200 atmospheres per sq. cm. can be employed. The temperatures can vary from 80° to 150° C. Hardening of the mass, as described below, improves the quality of the product.

The mass is very pliable when heated so that it will completely fill engraved moulds and reproduce the finest designs.

Both before and after hardening, it readily and uniformly absorbs the dye from dye solutions. The masses obtained in this manner form in every respect the most resistant artificial masses of albumenous substances obtainable.

The masses produced in this manner can also be improved substantially as regards bleaching and coloring.

The hardening of the formed masses is carried out by exposing them for a time dependent upon the desired results, to the action of formaldehyde. The masses can be immersed in a formaldehyde solution of the usual commercial concentration (35–40%) or of somewhat higher or lower concentrations. Alcoholic or other solutions of formaldehyde can be employed, as well as formaldehyde in the form of vapor or gas. The polymers can also be used, as well as substances which give up formaldehyde, such as hexamethylenetetramin.

The hardening amounts to a tanning process, and besides formaldehyde, other substances, such as chromic acid, tannic acid, alum, etc., can be used.

The direct bleaching of blood or blood serum, mentioned above as being hitherto practiced, requires comparatively large quantities of chemical additions by which the properties of the bleached blood are unfavorably affected.

Finished articles obtained by the application of heat and pressure merely to blood or serum can be bleached only imperfectly, whereby moreover the cooperation of alkali causes serious surface injuries to such articles.

According to the present invention, however, surprising results are obtained when bleaching the blood masses, whereby almost pure white products with the best properties as regards plasticity and resistibility against physical and chemical influences, are obtained. According to this process one starts with the above described mixture of pure and unbleached dry or slightly moistened blood substance and inorganic substances such as lithopone, heavy spar, etc., and the bleaching is effected by means of known bleaching agents, such hydrogen peroxide, used either hot or cold, after the completion of the pressed articles and either before or after the hardening thereof. However, the bleaching is preferably effected after the hardening.

As stated the bleaching of the masses is performed with commercial concentration of hydrogen peroxide ($H_2O_2$) or other bleaching agent, as chlorine, sulphur dioxide, and the like. With the peroxide the mass is immersed in an aqueous solution of the same, either hot or cold, and for a time depending upon the extent and penetration of the bleaching effect desired.

By reason of the peculiar structure of the masses obtained according to this invention the bleaching takes place quickly. For most purposes, a few minutes is sufficient so that the removal of color has taken place to change the mass from brown or dark gray (according to the proportions of blood and inorganic substances) to a pure ivory white. The surface of the articles thus bleached is absolutely smooth and shiny and undergoes no change, and exhibits, if polished before the bleaching, no reduction of the shine.

In a surprising manner, the bleached articles readily and effectively take up colors from solutions, after hardening, so that they can be colored permanently in any color and in any pattern.

The exceedingly easy and complete bleaching of such articles is due to the dilution of the blood coloring matter by the colloidal absorption of the blood molecules in the inorganic substances during the application of pressure and heat, and by reason of the ready permeability of the masses by the bleaching materials.

The ivory white tone obtained by bleaching is believed to be produced by the separation of the iron hydroxide, resulting from the bleaching, from the hæmatin, and can be converted into pure white by a short subsequent treatment of the articles with substances which dissolve out the iron hydroxide.

This iron hydroxide can be dissolved out by dilute or concentrated acid, such as hydrochloric acid, tartaric acid, etc., or mixtures thereof. Instead of using the acids, corresponding salts can be used, as, for examples, acid sodium oxalate or acid potassium tartrate and the like.

Further it has been found that colored masses can be produced directly from blood by mixing the blood with coloring matters, for example, mineral dyes or lake paints, and pressing the mixture in the manner above described into a plastic mass.

If these pressed masses are then treated, for example, with hydrogen peroxide, as above described, there remains in a short time a mass which possesses exactly the same color tone as the added color mixture. In this manner it is therefore possible, without subsequent over-coloring, to produce color masses of any shade, from blood. These masses can, if desired, then be hardened, in the manner described above.

The term "permeable" as used in the claims means that the moulded object may be penetrated by and acted upon by bleaching and coloring mediums as described in this specification, and does not refer to the water permeability of the moulded objects. Both objects moulded from blood alone and from blood mixed with filler are somewhat permeable to water. Objects moulded from blood alone, however, are not susceptible to action by bleaching and coloring mediums as are objects made in accordance with my invention. The term "dry blood" is intended to include slightly moist blood as described, the amount of water being of course insufficient to deprive the blood of its dry feel to the touch or to destroy its powdery character when finely ground.

What I claim and desire to secure by Letters Patent of the United States is:—

1. A process for the manufacture of moulded objects from dry blood comprising intimately mixing dry blood and an insoluble inorganic filling material adapted to render the object permeable after moulding, moulding the powdered mixture into a solid object by the application of heat and pressure, and subsequently treating said moulded object with a coloring agent.

2. A process for the manufacture of moulded objects from dry blood comprising intimately mixing dry blood and an insoluble inorganic filling material adapted to render the object permeable after moulding, moulding the powdered mixture into a solid object by the application of heat and pressure, and subsequently subjecting said moulded object to the action of a bleaching agent.

3. A process for the manufacture of moulded objects from dry blood comprising intimately mixing dry blood and an insoluble inorganic filling material adapted to render the object permeable after moulding, moulding the powdered mixture into a solid object by the application of heat and pressure, and subsequently treating said moulded object with bleaching and coloring agents.

4. A process for the manufacture of moulded objects from dry blood comprising intimately mixing dry blood and an insoluble inorganic filling material adapted to render the object permeable after moulding, moulding the powdered mixture into a solid object by the application of heat and pressure, subsequently bleaching said moulded object, and treating the bleached object with a coloring agent.

5. A process for the manufacture of moulded objects from dry blood comprising intimately mixing dry blood and an insoluble inorganic filling material adapted to render the object permeable after moulding, moulding the powdered mixture into a solid object by the application of heat and pressure, and subsequently coloring the surface of said moulded object by immersion in a dye solution.

6. A process for the manufacture of moulded objects from dry blood comprising intimately mixing dry blood and an insoluble inorganic filling material adapted to render the object permeable after moulding, moulding the powdered mixture into a solid object by the application of heat and pressure, subsequently treating said moulded object with a bleaching agent, and coloring the surface of said bleached object by immersion in a dye solution.

7. A process for the manufacture of moulded objects from dry blood comprising intimately mixing dry blood and an insoluble inorganic white filling material adapted to render the object permeable after moulding, moulding the powdered mixture into a solid object by the application of heat and pressure, and subsequently subjecting said moulded object to the action of a bleaching agent.

8. A process for the manufacture of moulded objects from dry blood comprising intimately mixing dry blood and an insoluble inorganic white filling material adapted to render the object permeable after moulding, moulding the powdered mixture into a solid object by the application of heat and pressure, subsequently subjecting said moulded object to the action of a bleaching agent, and removing iron hydroxide formed during the bleaching operation from the surface of said object by treatment with a suitable solvent.

9. A process for the manufacture of moulded objects from dry blood comprising intimately mixing dry blood and an insoluble inorganic white filling material adapted to render the object permeable after moulding, moulding the powdered mixture into a solid object by the application of heat and pressure, and subsequently coloring the surface of said moulded object by immersion in a dye solution.

10. A process for the manufacture of molded objects from dry blood comprising intimately mixing dry blood, an insoluble inorganic filling material adapted to render the article permeable after molding and a coloring agent, molding the powdered mixture into a solid object by the application of heat and pressure, and subsequently subjecting said molded object to the action of a bleaching agent.

In testimony whereof I have signed my name to this specification.

FELIX HOMBERG.